A. M. HAUCK.
HARROW.
APPLICATION FILED FEB. 17, 1909.
948,276.
Patented Feb. 1, 1910.
2 SHEETS—SHEET 1.
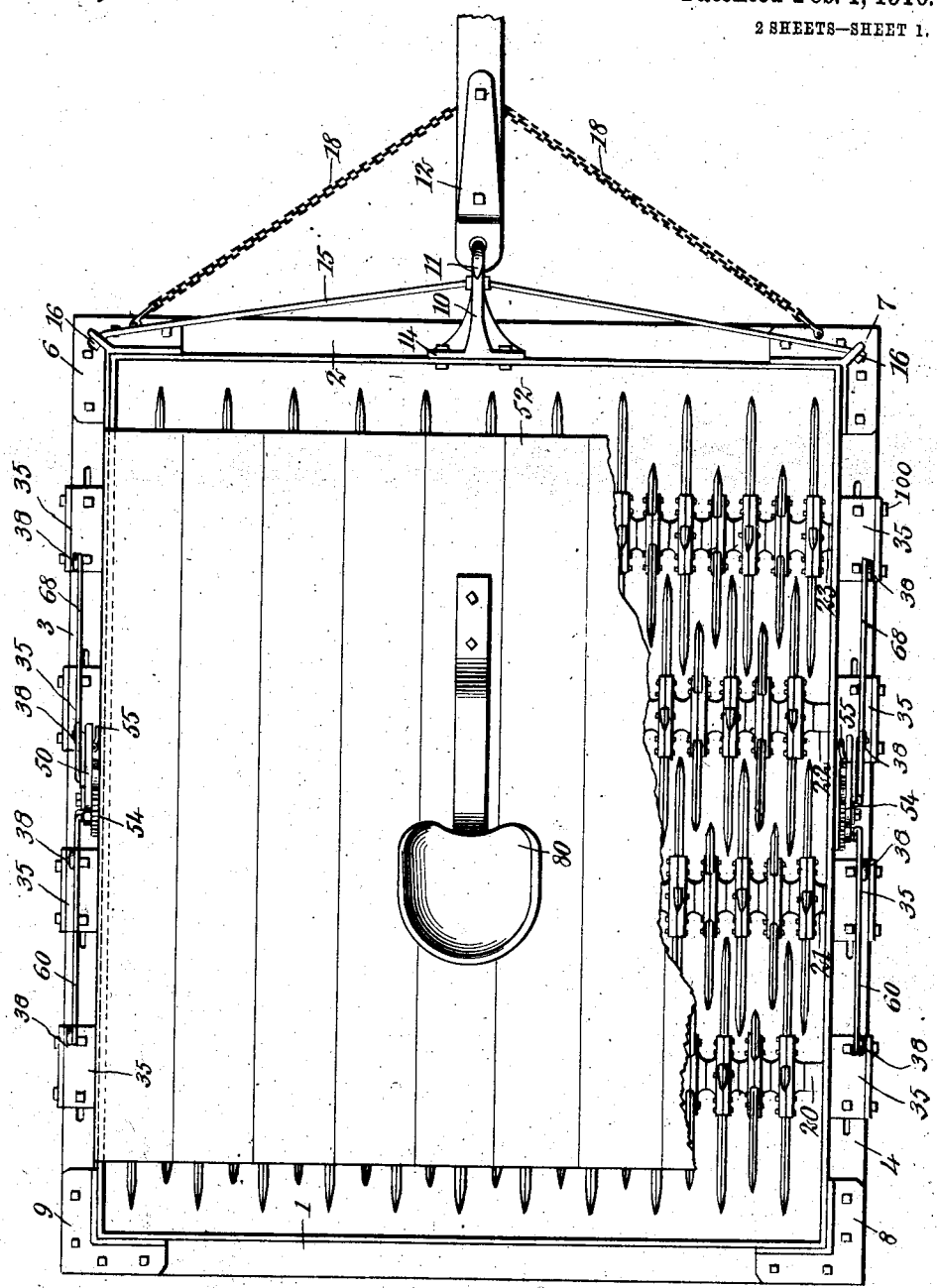
WITNESSES
INVENTOR
Alexander M. Hauck
BY
ATTORNEYS A. M. HAUCK.
HARROW.
APPLICATION FILED FEB. 17, 1909.
948,276.
Patented Feb. 1, 1910.
2 SHEETS—SHEET 2.
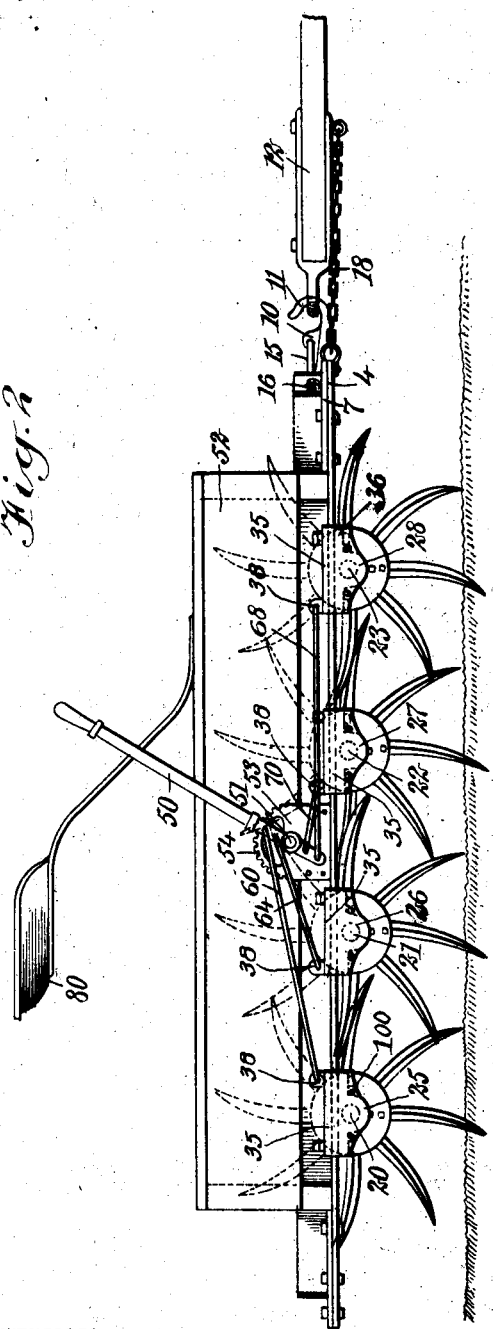
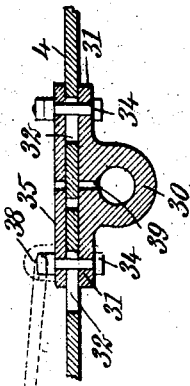
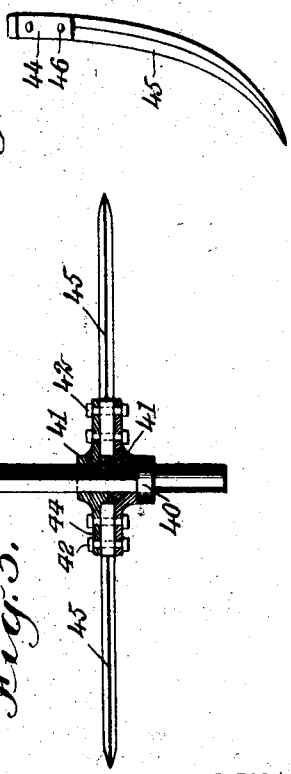
WITNESSES
INVENTOR
Alexander M. Hauck
BY Munn & Co.
ATTORNEYS

UNITED STATES PATENT OFFICE.

ALEXANDER M. HAUCK, OF SEATTLE, WASHINGTON.

HARROW.

948,276. Specification of Letters Patent. Patented Feb. 1, 1910.

Application filed February 17, 1909. Serial No. 478,366.

*To all whom it may concern:*

Be it known that I, ALEXANDER M. HAUCK, a citizen of the United States, and a resident of Seattle, in the county of King and State of Washington, have invented a new and Improved Harrow, of which the following is a full, clear, and exact description.

This invention relates to harrows provided with wheels for cutting or pulverizing the soil or clods.

The object of the invention is to provide means whereby the shafts upon which the wheels are mounted may be moved toward and from one another, in order to vary the degree of fineness with which the earth is pulverized.

The invention consists in the construction and combination of parts, to be more fully described hereinafter and particularly set forth in the claims.

Reference is to be had to the accompanying drawings, forming a part of this specification, in which similar characters of reference indicate corresponding parts in all the views, and in which, Figure 1 is a plan view, with parts broken away to show the wheels; Fig. 2 is a side elevation of the harrow, complete; Fig. 3 is a detail view, partly in section, showing the construction of a wheel and the manner in which it is mounted upon its shaft; Fig. 4 is a detail view of one of the teeth; and Fig. 5 is a vertical detail sectional view, showing one of the boxes for supporting a shaft and the manner in which it is mounted upon the frame of the machine.

In its present embodiment, the harrow comprises a frame, composed of members 1, 2, 3 and 4, which may be made of angle-iron and fastened together at the corners of the frame by angle-plates 6, 7, 8 and 9. A draw-bar 10 may be provided with a hook 11 on one end for connection with a pole 12. The other end of the draw-bar 10 may be formed with a base 14, which is bolted to the frame member 2. A truss-rod 15 connects the plates 6 and 7 and extends through the draw-bar 10. The ends of said truss-rod 15 may be provided with screw-threads for the reception of nuts 16. A chain 18 is provided, which is connected at its ends to the plates 6 and 7, and at its central portion to the pole 12.

A plurality of shafts 20, 21, 22 and 23 are journaled in bearings 25, 26, 27 and 28 respectively. Each bearing comprises a central boss 30, having laterally-extending flanges 31, which are adapted to rest against the under side of the side members of the frame of the harrow. Each side member is provided with slots 32, which receive bolts 34. Said bolts pass through the flanges 31 and through the slots 32 into an angle-plate 35, which is adapted to rest upon the upper side of the horizontal portion of the side frames of the harrow. Each angle-plate 35 is formed with a depending portion 36 on one end thereof, which extends across the end of the boss 30 and may be fastened with bolts or rivets 100. Said angle-plate acts as a guide to support the shaft held in the bearing blocks, and the depending portion of said plate acts to protect the journal from dirt. Each angle-plate 35 is formed with an upwardly-projecting lug 38, which is adapted to be connected to the operating mechanism, as will be hereinafter explained. An oil hole 39 may be provided for each bearing.

Each shaft is formed with cylindrical portions at its ends, which are received within the cylindrical bearings formed in the bosses 30. Each shaft is formed at the inner end of the cylindrical portion with a collar 40. One of these collars may be made integral with the shaft, and the other may be secured by means of a set-screw or pin. Each wheel comprises two disks 41, which are arranged to be fastened together by means of bolts or rivets 42. Said disks are formed with channels on their inner faces, which receive flattened ends 44 of the teeth 45. The bolts 42 extend through the holes 46 formed in said flattened portions. The wheels may be mounted upon the shafts in staggered relation, and the wheels on any one shaft may be made to abut one another.

A lever 50 is pivoted at 51 to a plate 53, which is bolted to the frame of the harrow. A sector-rack 54 is formed on the plate 53, and its teeth are adapted to co-act with a hand lever 55 supported by the lever 50. By moving the hand lever 55, the position of the lever 50 may be changed, and then said lever may be locked in its adjusted position in the well known manner. A link 60 connects the lever 50 with the lug 38 on the plate 35 connected with the bearing 25; a link 64 connects the lever 50 with the lug 38 on the plate 35 connected with the bearing 26; a link 68 connects the lever 50 with the lug 38 on the plate 35 connected with the bearing 28; and a link 70 connects the lever 50 with the lug 38 on the plate 35 connected with the bearing 27.

The lever 50 may be duplicated on the other side of the machine, so that it may be possible for the operator to move both levers simultaneously, in order to have a more even distribution of the power exerted in moving the shafts.

If desired, the harrow may be provided with three shafts; one stationary and the others movable. The movable shafts will be operatively connected to the operating lever by means of links, one being attached above the fulcrum of said lever and one being attached below. In the present embodiment, four movable shafts are shown, two of the links being attached above the fulcrum of the lever 50, and two being attached below said fulcrum.

A seat 80 may be mounted upon the cover 52, and the pole 12 may be provided with cross arms, in order that a series of harrows may be connected together.

From the construction above set forth, it will be seen that the wheels all rotate in the same direction, and that while the teeth on the front half of the wheel are moving downwardly, the teeth on the rear half are moving upwardly. Thus the opposing teeth of adjacent shafts are moving in opposite directions. By moving the lever 50, the distances between the various shafts may be varied simultaneously. In this manner, the degrees of evenness with which the dirt or clods are broken up may be regulated.

Having thus described my invention, I claim as new and desire to secure by Letters Patent:—

1. In a harrow of the type described, the combination of a frame, a plurality of bearings slidably mounted in said frame on opposite sides thereof and one in front of the other, shafts mounted in the bearings, wheels mounted on each shaft, and means operatively connected to said bearings for varying the distance between them.

2. In a harrow of the type described, the combination of a frame, a plurality of bearings slidably mounted on said frame one in front of the other, shafts mounted in the bearings, wheels on said shafts, a lever, and links connecting said lever and bearings, whereby the distance between the latter may be varied.

3. In a harrow of the type described, the combination of a frame, bearings slidably mounted on said frame, a plurality of shafts journaled in said bearings, a lever pivoted adjacent to one end to the frame intermediate of the ends of said frame, and links connecting said bearings with said lever, some of the links being connected to the lever above its pivot and others below said pivot, whereby said bearings may be caused to approach or recede from one another.

4. In a harrow of the class described, the combination of a frame, bearings slidably mounted on said frame, plates supported by said frame and extending across the outer ends of said bearings, shafts having wheels and journaled in said bearings, and means for simultaneously moving said shafts along said frame.

5. In a harrow of the class described, a frame having slotted side members, a plurality of bearings on the under side of the side members of the frame, plates on the upper face of the side members of the frame above the bearings and provided with lugs, bolts passing through the bearings, the slots of the frame and the said plates, whereby the bearings are free to slide on said frame, a lever pivoted to the frame at about its center of length, and links pivoted to the lever and to the lugs of said plates, some of the links being pivoted to the lever above its pivot and others below said pivot.

In witness whereof I have signed my name to this specification in the presence of two subscribing witnesses.

ALEXANDER M. HAUCK.

Witnesses:
O. M. SPEAR,
C. K. CAMPBELL.